United States Patent
Phelps et al.

(10) Patent No.: US 10,119,576 B2
(45) Date of Patent: Nov. 6, 2018

(54) OPTIMIZED OUTER CLUTCH HOUSING FOR REDUCED SPIN LOSS, IMPROVED OIL FLOW AND IMPROVED CLUTCH DURABILITY

(71) Applicant: American Axle & Manufacturing, Inc., Detroit, MI (US)

(72) Inventors: Chris Phelps, Royal Oak, MI (US); Jeffrey L. Kincaid, Clarkston, MI (US); John C. Hibbler, Lake Orion, MI (US); Paul W. Kornosky, Auburn Hills, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 345 days.

(21) Appl. No.: 15/049,320

(22) Filed: Feb. 22, 2016

(65) Prior Publication Data
US 2016/0169297 A1 Jun. 16, 2016

Related U.S. Application Data

(63) Continuation of application No. 14/460,597, filed on Aug. 15, 2014, now Pat. No. 9,303,696.
(Continued)

(51) Int. Cl.
*F16D 13/74* (2006.01)
*F16D 25/0638* (2006.01)
(Continued)

(52) U.S. Cl.
CPC .......... *F16D 13/74* (2013.01); *F16D 13/52* (2013.01); *F16D 25/0638* (2013.01);
(Continued)

(58) Field of Classification Search
CPC ...... F16D 13/74; F16D 13/52; F16D 25/0638; F16D 2300/06; F16D 25/123; F16H 57/0424; F16H 57/0473
See application file for complete search history.

(56) References Cited

U.S. PATENT DOCUMENTS 2,138,169 A 11/1938 Hunt
2,205,629 A 6/1940 Peterson
(Continued)

FOREIGN PATENT DOCUMENTS

| CN | 102089171 A | 6/2011 |
|---|---|---|
| EP | 2574826 A1 | 4/2013 |
| EP | 2574827 A1 | 4/2013 |

*Primary Examiner* — Huan Le
(74) *Attorney, Agent, or Firm* — Harness, Dickey & Pierce, P.L.C.

(57) ABSTRACT

A torque transfer device can include a housing and a clutch. The housing can define a clutch cavity and a pocket. The pocket can be formed at an axial end of the clutch cavity and have a generally arcuate shape that extends circumferentially about the clutch cavity above a static lubrication level. The clutch can include an outer carrier, an inner carrier, a plurality of first and second interleaved friction plates. One of an outer and an inner plate carrier of the clutch can be coupled to an input member for common rotation. The other of the carriers can be coupled to a differential case for common rotation. Rotation of the outer carrier relative to the housing through a fluid in the clutch cavity can sling a portion of the fluid toward an inner surface of the housing to cause the portion of the fluid to collect in the pocket.

19 Claims, 6 Drawing Sheets

Related U.S. Application Data

(60) Provisional application No. 61/869,359, filed on Aug. 23, 2013.

(51) Int. Cl.
    F16D 25/12     (2006.01)
    F16D 13/52     (2006.01)
    F16H 57/04         (2010.01)

(52) U.S. Cl.
    CPC ........ F16D 25/123 (2013.01); F16H 57/0424 (2013.01); F16H 57/0473 (2013.01)

(56) References Cited

U.S. PATENT DOCUMENTS

| | | |
|---|---|---|
| 2,270,482 A | 1/1942 | Stolte |
| 2,359,104 A | 9/1944 | Geyer |
| 2,359,184 A | 9/1944 | Wolfram |
| 3,128,639 A | 4/1964 | Hein |
| 3,324,983 A * | 6/1967 | White ................ F16D 25/0638 192/104 F |
| 3,366,210 A | 1/1968 | Webster |
| 3,366,211 A | 1/1968 | May |
| 3,581,858 A | 6/1971 | Haley |
| 3,768,613 A | 10/1973 | Brunner |
| 3,884,335 A | 5/1975 | Ashfield et al. |
| 4,023,661 A | 5/1977 | Flotow |
| 4,085,835 A | 4/1978 | Bailey |
| 4,270,647 A | 6/1981 | Leber |
| 4,382,497 A | 5/1983 | Sakai et al. |
| 4,413,716 A | 11/1983 | Newsome et al. |
| 4,458,793 A | 7/1984 | Riese et al. |
| 4,488,626 A | 12/1984 | Handke |
| 4,529,074 A | 7/1985 | Alas |
| 4,544,055 A | 10/1985 | Kronstadt |
| 4,751,989 A | 6/1988 | Shinokawa et al. |
| 4,873,880 A | 10/1989 | Amedei et al. |
| 4,886,153 A | 12/1989 | Takenaka et al. |
| 5,518,098 A | 5/1996 | Zanetel et al. |
| 6,189,669 B1 | 2/2001 | Kremer et al. |
| 6,296,590 B1 | 10/2001 | Gassmann |
| 6,543,596 B2 | 4/2003 | Martin et al. |
| 6,550,595 B2 | 4/2003 | Kuczera |
| 6,595,338 B2 | 7/2003 | Bansbach et al. |
| 6,837,817 B2 | 1/2005 | Mori et al. |
| 6,840,363 B2 | 1/2005 | Braford, Jr. et al. |
| 6,883,657 B2 | 4/2005 | Bansbach et al. |
| 6,997,299 B2 | 2/2006 | Brissenden et al. |
| 7,001,298 B2 | 2/2006 | Biermann et al. |
| 7,111,716 B2 | 9/2006 | Ekonen et al. |
| 7,294,086 B2 | 11/2007 | Brissenden et al. |
| 7,416,069 B2 | 8/2008 | Tiesler |
| 7,540,212 B2 | 6/2009 | Oki et al. |
| 7,673,730 B2 | 3/2010 | Metzinger et al. |
| 7,717,244 B2 | 5/2010 | Rowell |
| 7,966,901 B2 | 6/2011 | Metzinger et al. |
| 8,215,440 B2 | 7/2012 | Hoffmann et al. |
| 8,316,738 B2 | 11/2012 | Hellinger et al. |
| 2001/0011622 A1 | 8/2001 | Arai et al. |
| 2002/0139634 A1 | 10/2002 | Porter |
| 2002/0144851 A1 | 10/2002 | Porter |
| 2004/0106487 A1 | 6/2004 | Mori et al. |
| 2004/0129475 A1 | 7/2004 | Forsyth et al. |
| 2005/0230214 A1 | 10/2005 | Puiu |
| 2006/0163018 A1 | 7/2006 | Ekonen et al. |
| 2007/0026983 A1* | 2/2007 | Shimizu ................ B60K 17/344 474/43 |
| 2007/0111842 A1 | 5/2007 | Suzuki et al. |
| 2008/0128212 A1 | 6/2008 | Utzat et al. |
| 2009/0088287 A1 | 4/2009 | Chludek et al. |
| 2010/0105513 A1* | 4/2010 | Hilker ................ F16H 57/0483 475/160 |
| 2010/0313706 A1 | 12/2010 | Hellinger et al. |
| 2013/0303326 A1 | 11/2013 | Downs et al. |
| 2014/0231209 A1 | 8/2014 | Nett et al. |
| 2014/0231211 A1 | 8/2014 | Nett et al. |
| 2014/0262676 A1 | 9/2014 | Niwata |
| 2015/0057125 A1 | 2/2015 | Pump et al. |

* cited by examiner

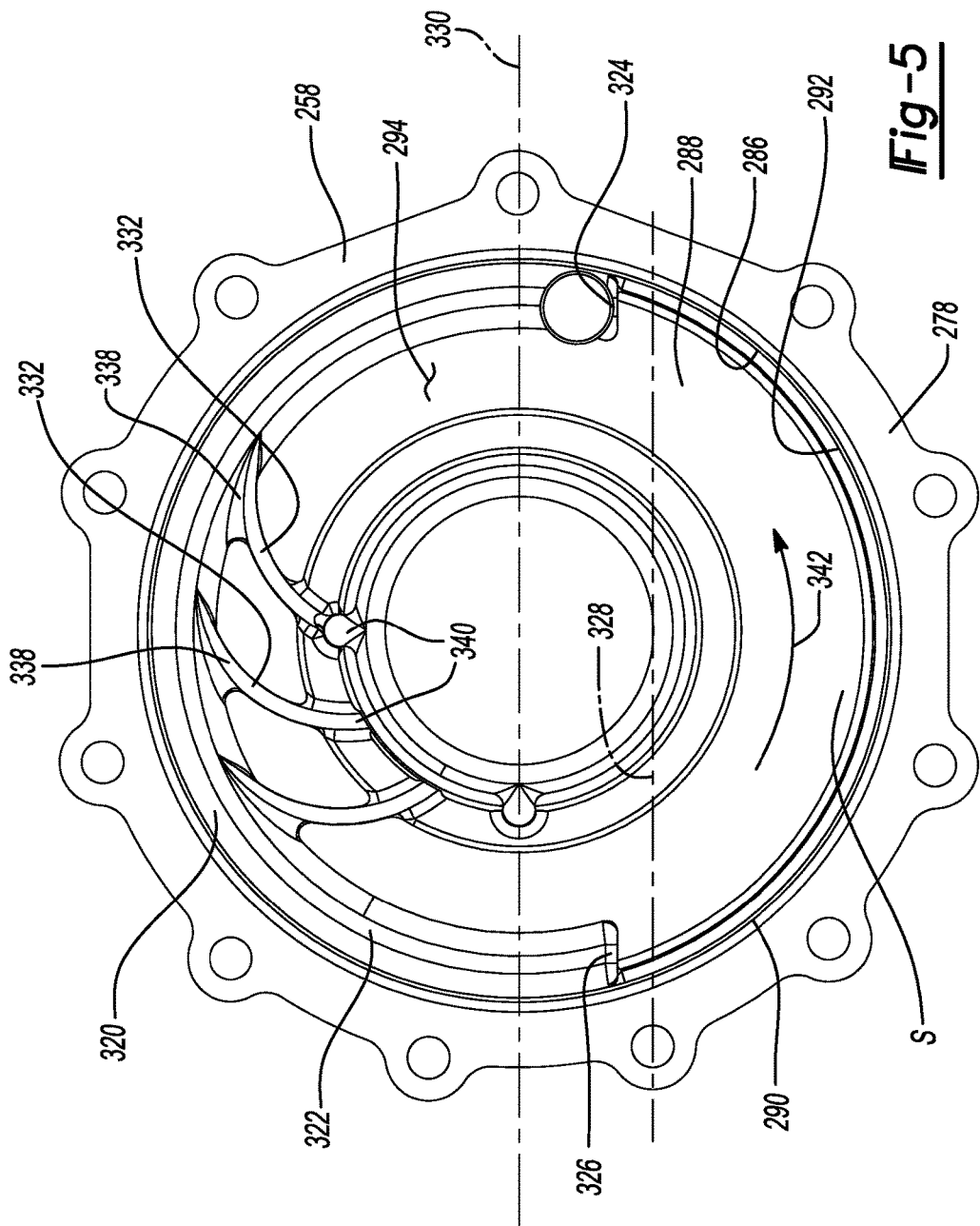

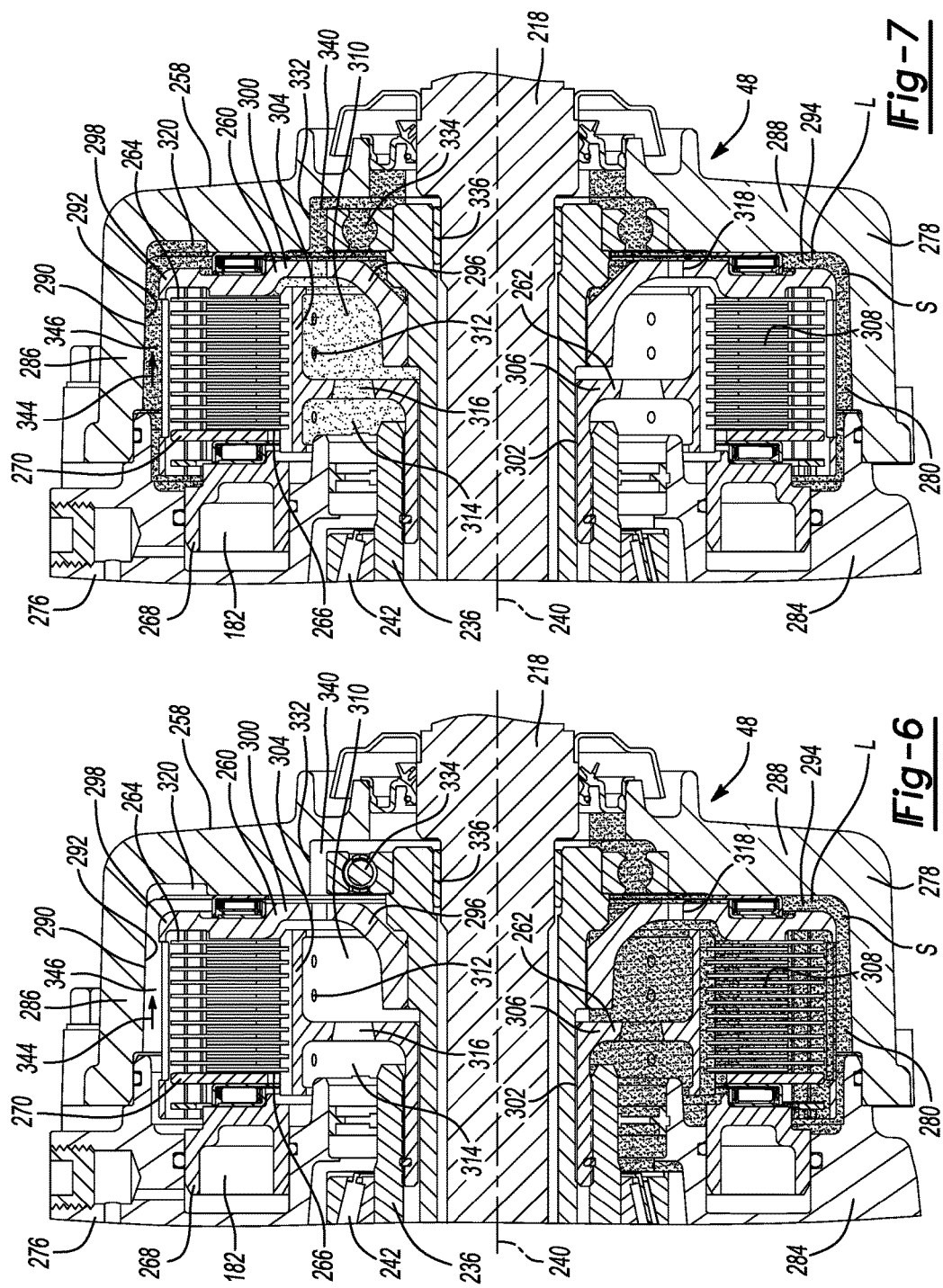

OPTIMIZED OUTER CLUTCH HOUSING FOR REDUCED SPIN LOSS, IMPROVED OIL FLOW AND IMPROVED CLUTCH DURABILITY

CROSS-REFERENCE TO RELATED APPLICATIONS

This application is a continuation of U.S. application Ser. No. 14/460,597, filed Aug. 15, 2014, which claims the benefit of U.S. Provisional Application No. 61/869,359, filed on Aug. 23, 2013. The entire disclosure of the above application is incorporated herein by reference.

FIELD

The present disclosure relates to power transmitting components having an optimized outer clutch housing for reduced spin loss, improved oil flow and improved clutch durability.

BACKGROUND

This section provides background information related to the present disclosure which is not necessarily prior art.

Power transmitting components with a torque transfer device, such as a disconnecting drive module in an all wheel drive ("AWD") system, can include a clutch with a plurality of friction plates and a piston for selectively driving the friction plates into engagement with one another. The friction plates are generally bathed in a fluid to provide lubrication and cooling of the friction plates when the clutch is engaged. When the clutch is disengaged, fluid between the friction plates and within a clutch sump through which the friction plates rotate can undesirably increase the system drag torque. To reduce the magnitude of the system drag torque, the level of fluid within the clutch sump could be reduced. However, sufficient fluid must be available during engagement of the clutch to ensure that the clutch will not experience premature wear.

SUMMARY

This section provides a general summary of the disclosure, and is not a comprehensive disclosure of its full scope or all of its features.

The present teachings provide for a torque transfer device including a housing, an input pinion, an input member, a first output member, a second output member, a differential, a shaft, a fluid, and a friction clutch. The housing can define a clutch cavity and a pocket. The pocket can be formed at an axial end of the clutch cavity and can have a generally arcuate shape that can extend circumferentially about the clutch cavity and can be above a static lubrication level when the torque transfer device is disposed in a predetermined orientation. The input pinion can be configured for rotation about a first axis. The input member can be configured for rotation about a second axis and can be meshingly engaged with the input pinion. The differential can include a differential case and a differential gearset. The differential gearset can be configured to transmit rotary power between the differential case and the first and second output members. The shaft can be supported within the housing for rotation about the second axis and can be coupled for common rotation with the differential case. The fluid can be received in the clutch cavity. The friction clutch can include an outer carrier, an inner carrier, a plurality of first friction plates, and a plurality of second friction plates. The outer carrier can have a first plate mount onto which the first friction plates are non-rotatably mounted. The inner carrier can have a second plate mount onto which the second friction plates are non-rotatably mounted. The second friction plates can be interleaved with the first friction plates. One of the outer and inner carriers can be coupled to the shaft for common rotation. The other of the outer and inner carriers can be coupled to the input member for common rotation. Rotation of the outer carrier relative to the housing in a predetermined rotational direction through the fluid in the clutch cavity can sling a portion of the fluid toward an inner surface of the housing to cause the portion of the fluid to collect in the pocket.

The present teachings further provide for a torque transfer device including a housing, an input pinion, an input member, a first output member, a second output member, a differential, a shaft, and a friction clutch. The housing can have a circumferential wall and a pair of end walls. The circumferential wall can extend circumferentially about an axis. The end walls can be located at opposite axial ends of the circumferential wall. The circumferential wall and pair of end walls can define a clutch cavity. The input pinion can be configured for rotation about a first axis. The input member can be configured for rotation about a second axis and can be meshingly engaged with the input pinion. The differential can include a differential case and a differential gearset. The differential gearset can be configured to transmit rotary power between the differential case and the first and second output members. The shaft can be supported within the housing for rotation about the second axis and can be coupled for common rotation with the differential case. The friction clutch can include an outer carrier, an inner carrier, a plurality of first friction plates, and a plurality of second friction plates. The outer carrier can have a first plate mount onto which the first friction plates are non-rotatably mounted. The inner carrier can have a second plate mount onto which the second friction plates are non-rotatably mounted. The second friction plates can be interleaved with the first friction plates and can be configured to transmit rotational power between the shaft and the input member. One of the end walls can define a pocket proximate to the circumferential wall. The pocket can extend about a portion of the circumference of the one of the end walls and above a static lubrication level when the torque transfer device is disposed in a predetermined orientation and a predetermined volume of a fluid is received in the clutch cavity. Rotation of the outer carrier relative to the housing in a predetermined rotational direction through the fluid in the clutch cavity can sling a portion of the fluid toward an inner surface of the housing to cause the portion of the fluid to be retained by the pocket.

The present teachings further provide for a torque transfer device including an input pinion, an input member, a first output member, a second output member, a differential, a housing, a lubricant fluid, a first shaft, a bearing, and a friction clutch. The input pinion can be configured for rotation about a first axis. The input member can be configured for rotation about a second axis and can be meshingly engaged with the input pinion. The differential can include a differential case and a differential gearset. The differential gearset can be configured to transmit rotary power between the differential case and the first and second output members. The housing can define a clutch cavity and a pocket. The pocket can be formed at an axial end of the clutch cavity and can extend circumferentially above a static lubrication level when the torque transfer device is disposed in a predetermined orientation. The lubricant fluid can be received in the clutch cavity. The first shaft can be disposed in the clutch cavity and can be coupled for common rotation with the differential case. The bearing can be disposed between the shaft and the housing. The friction clutch can include an outer clutch plate carrier, an inner clutch plate carrier, a plurality of first friction plates, and a plurality of second friction plates. The outer clutch plate carrier can have a first plate mount onto which the first friction plates are axially slidably but non-rotatably mounted. The inner clutch plate carrier can have a second plate mount onto which the second friction plates are axially slidably but non-rotatably mounted. The second friction plates can be interleaved with the first friction plates and can be configured to transmit rotational power between the shaft and the input member. The outer clutch plate carrier and the housing can define a radial space disposed between the outer clutch plate carrier and the housing. The radial space can extend in an axial direction along a rotational axis of the outer clutch plate carrier. The radial space can intersect the pocket and be sized so that lubricant fluid slung from the outer clutch plate carrier can be directed axially along the housing to the pocket. The pocket can include a first lubricant feed gallery that can be configured to direct lubricant from the pocket to one of the bearing to lubricate the bearing, and an orifice through the second plate mount to lubricate the first and second clutch plates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a side elevation view of a portion of the clutch housing of FIG. 4;

FIG. 6 is a cross-sectional view of the clutch of FIG. 4 taken along line 6-6 of FIG. 2, illustrating a location of a lubricant fluid when the vehicle is at rest; and FIG. 7 is a cross-sectional view of the clutch of FIG. 4 taken along line 7-7 of FIG. 2, illustrating a location of a lubricant fluid when the vehicle is moving and the clutch is in a first state.

Corresponding reference numerals indicate corresponding parts throughout the several views of the drawings.

DETAILED DESCRIPTION

Example embodiments will now be described more fully with reference to the accompanying drawings.

Figure 1:
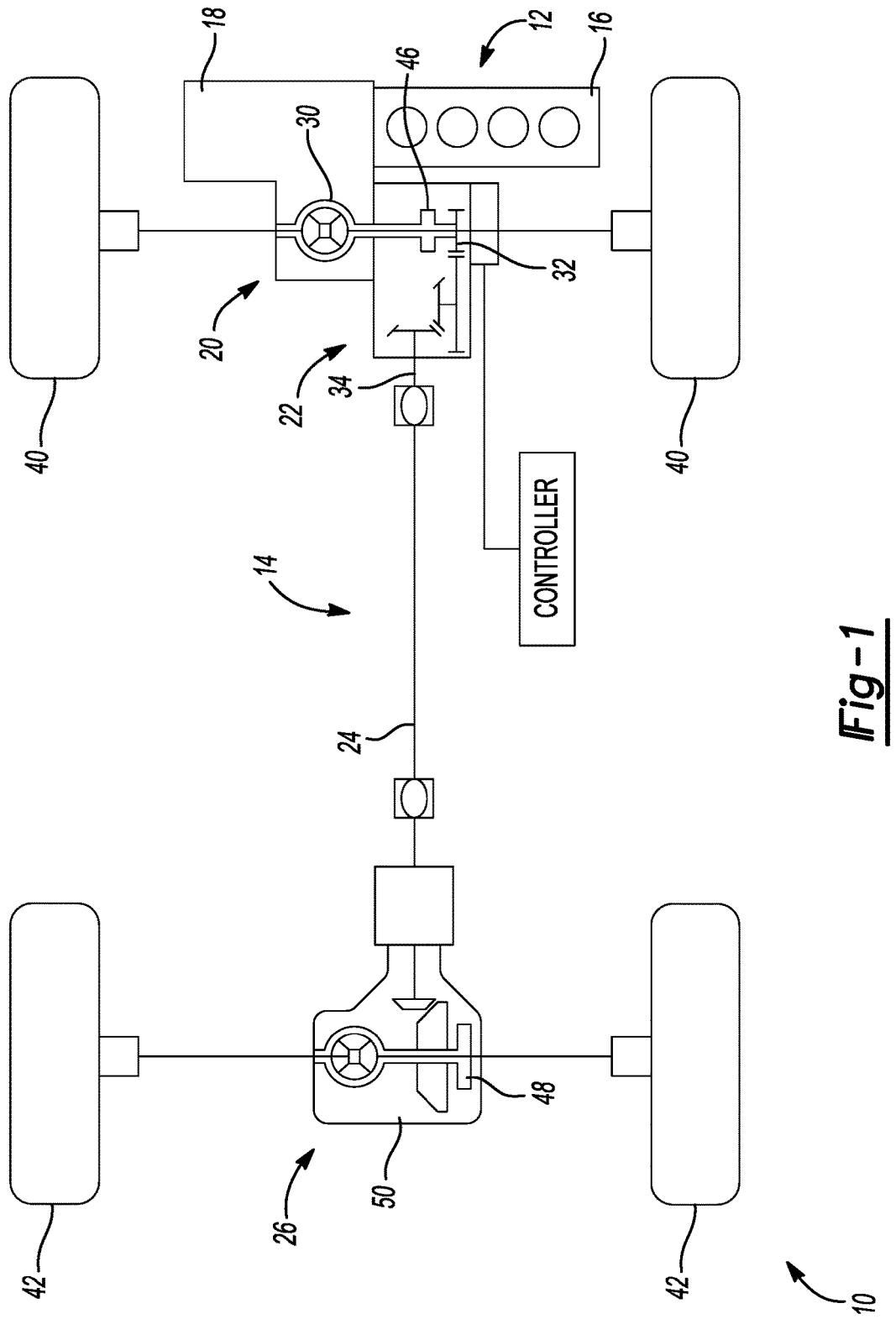
FIG. 1 is a schematic illustration of an exemplary vehicle having a power transmitting component constructed in accordance with the present teachings.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations. The drive train 14 can include a front axle assembly 20, a power take-off unit (PTU) 22, a prop shaft 24 and a rear axle assembly 26. The front axle assembly 20 can be configured in any desired manner, such as a front transaxle, a front beam axle, or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. Alternatively, the drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a power transmitting component) that is constructed in accordance with the teachings of the present disclosure. It will be appreciated, however, that the teachings of the present disclosure have application to various other power transmitting components, such as transmissions, power take-offs, torque transfer devices, transfer cases, front axle assemblies, center bearing assemblies for propshafts and any other power transmitting components that have a housing, a shaft and a shaft seal.

Figure 2:
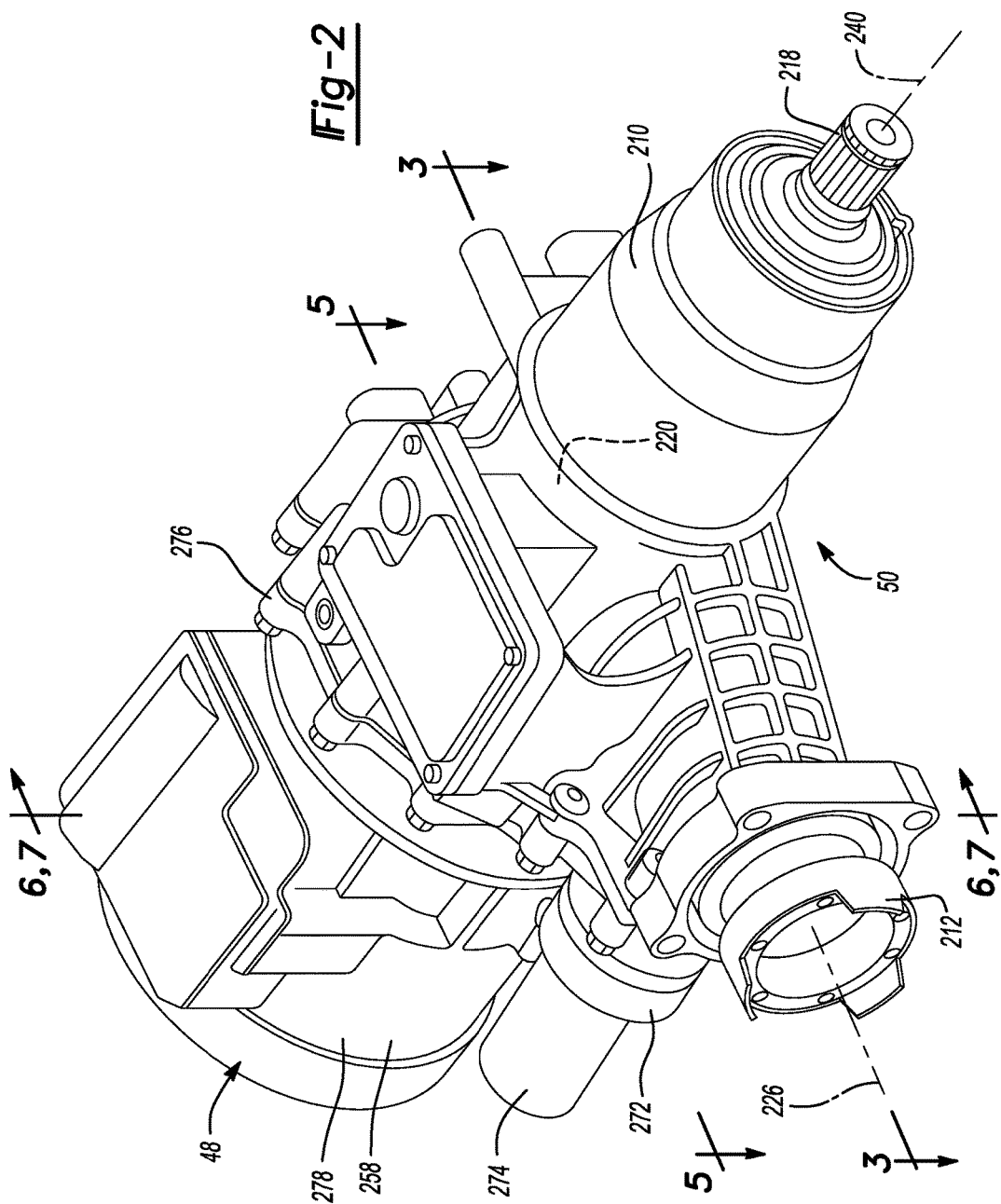
FIG. 2 is a perspective view of the power transmitting component of FIG. 1.
Figure 3:
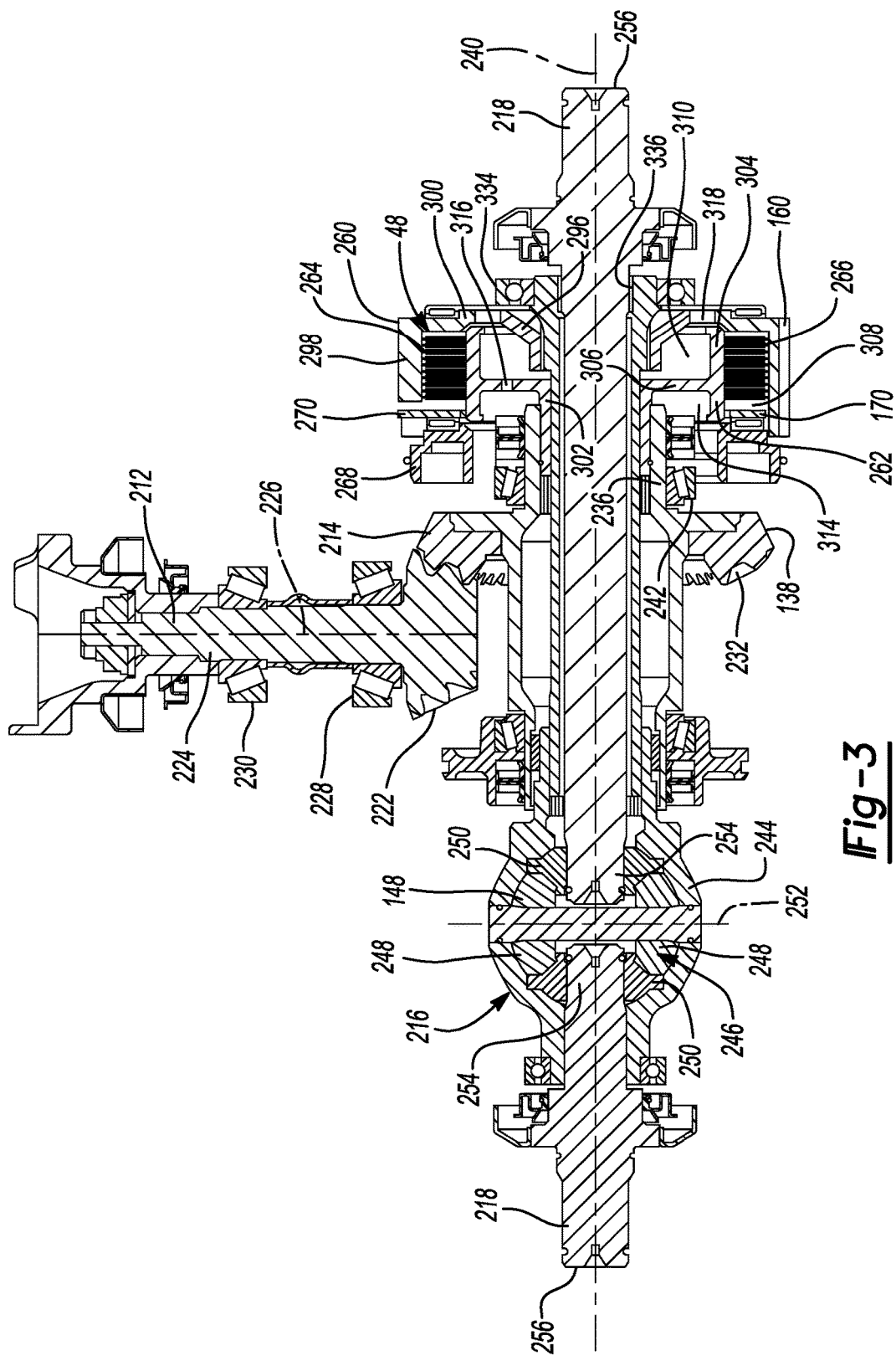
FIG. 3 is a cross-sectional view of the power transmitting unit of FIG. 2 taken along line 3-3 of FIG. 2.
Figure 4:
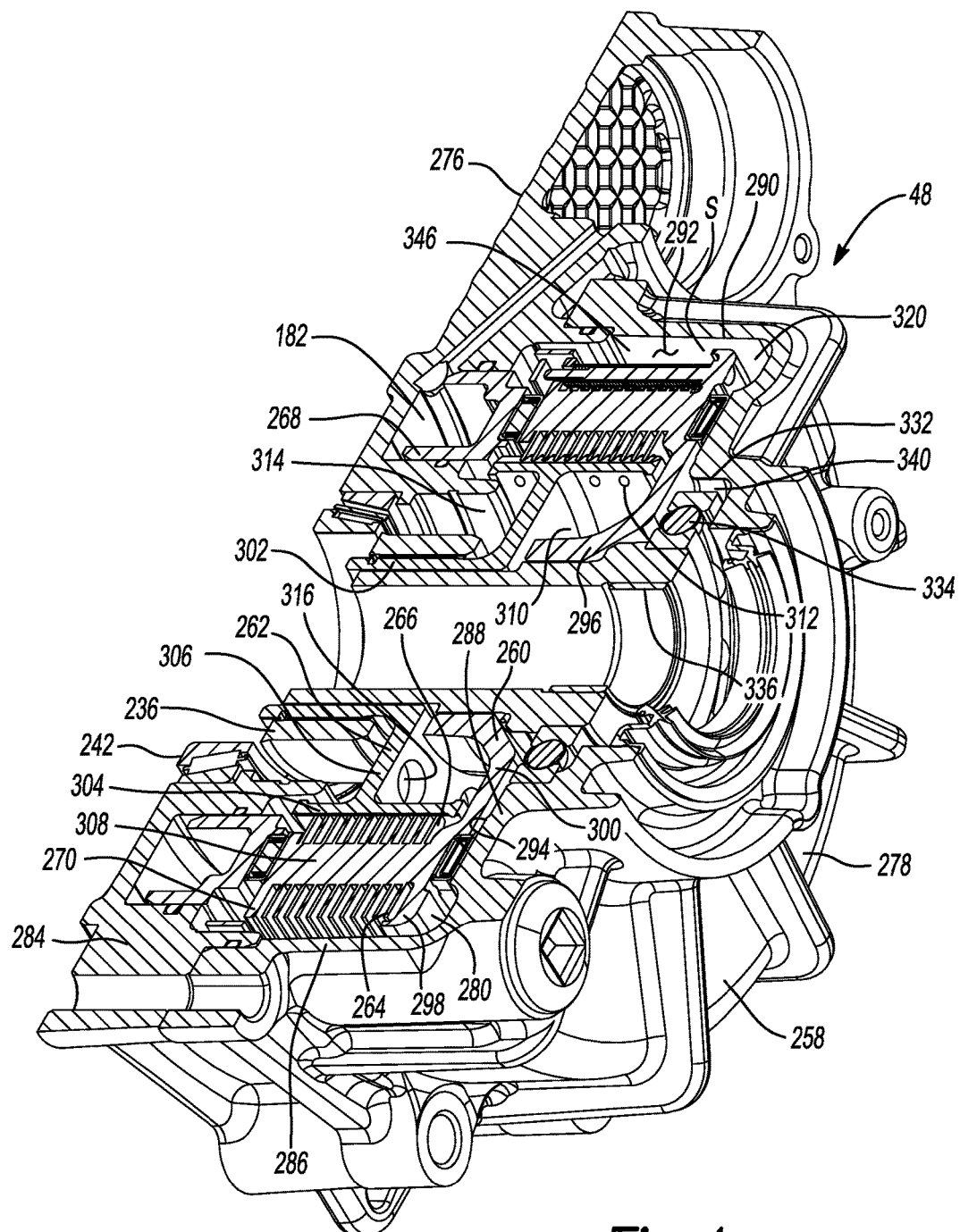
FIG. 4 is a cross-sectional perspective view of a portion of the power transmitting component of FIG. 1 taken along line 4-4 of FIG. 2, illustrating a clutch having a clutch housing for reduced spin loss.

With reference to FIGS. 2-4, the rear drive module 50 is illustrated in more detail. The rear drive module 50 can include a housing 210, an input pinion 212, an input member 214, the second clutch 48, a differential assembly 216, and a pair of output shafts 218. The input pinion 212, input member 214, the second clutch 48, the differential assembly 216, and the output shafts 218 can be constructed in a manner that is disclosed in co-pending U.S. patent application Ser. No. 13/470,941 and as such, a detailed discussion of these components is not needed herein. Briefly, the housing 210 can define a first cavity 220 and the input pinion 212 can be a hypoid pinion having a hypoid gear 222 and an input pinion shaft 224. The hypoid gear 222 can be disposed within the first cavity 220. The input pinion shaft 224 can be supported for rotation in the housing 210 along a first axis 226 by a head bearing 228 proximate to the hypoid gear 222 and a tail bearing 230 distal to the hypoid gear 222 and proximate to the prop shaft 24. The input member 214 can be a ring gear having a gear face 232 and an axially extending portion 236. The axially extending portion 236 can be supported for rotation in the housing 210 about a second axis 240 by a bearing 242. The second axis 240 can be generally perpendicular to the first axis 226. The gear face 232 can be meshingly engaged with the input pinion 212.

The differential assembly 216 can include a differential case 244 and a differential gearset 246. The differential case 244 can be configured for rotation about the second axis 240. The differential gearset 246 can be configured to transmit rotary power between the differential case 244 and the output shafts 218. In the example provided, the differential gearset 246 includes a pair of side gears 248 and a pair of output gears 250 disposed within the differential case 244. The side gears 248 can be coupled for rotation with the differential case 244 about the second axis 240 and coupled for rotation relative to the differential case 244 about a third axis 252. The third axis 252 can be generally perpendicular to the second axis 240. The third axis 252 can be generally parallel with the first axis 226. The output gears 250 can be meshingly engaged with the side gears 248 and configured to rotate about the second axis 240. Each of the output shafts 218 can have a first end 254, which can be drivingly coupled to a respective one of the output gears 250, and a second, opposite end 256 that can be coupled to a corresponding one of the rear wheels 42 (FIG. 1).

The second clutch 48 can be selectively operated to transmit rotary power from the input member 214 to the differential case 244. In the particular example provided, the second clutch 48 is a friction clutch that is mounted co-axially with the input member 214 and the differential assembly 216. The second clutch 48 can include a clutch housing 258, an outer clutch plate carrier 260, an inner clutch plate carrier 262, a plurality of first clutch plates 264, a plurality of second clutch plates 266, a piston 268, an apply plate 270, a pump 272 and a pump motor 274. The clutch housing 258 can be integrally formed with or partially formed by the housing 210 of the rear drive module 50 or can be mounted to the housing 210. The clutch housing 258 can include a first side 276 and a second side 278 that can define a second cavity 280 and a piston chamber 182. The first side 276 can include a wall 284 that can separate the first cavity 220 from the second cavity 280. The outer and inner clutch plate carriers 260, 262 and the first and second clutch plates 264, 266 can be received in the second cavity 280. A portion of the second cavity 280 can define a clutch sump S wherein a lubricant fluid L (shown in FIG. 6) can collect when the outer clutch plate carrier 260 is not rotating. The second side 278 can have an outer circumferential wall 286 and a second wall 288. The outer circumferential wall 286 can define a bore 290 having an inner bore surface 292 and the second wall 288 can have an inner wall surface 294. The inner bore surface 292 and inner wall surface 294 can face generally inward to at least partially define the second cavity 280. In the example shown, the bore 290 is "as cast" (i.e., net shaped when cast) and is formed with draft (i.e., taper), but it should be appreciated that draft or tapering is not needed. Also, the amount of radial or circumferential clearance between the outside diameter of the outer clutch plate carrier 260 and the inside diameter of the bore 290 will vary depending on various design criteria, including the outside diameter of the outer clutch plate carrier 260.

The outer clutch plate carrier 260 can have an inner portion 296, a first plate mount 298, and a first connecting portion 300. The inner portion can be radially inward of the first plate mount 298 and non-rotatably coupled to the differential case 244. The plurality of first clutch plates 264 can be non-rotatably and axially slidably coupled to the first plate mount 298. The inner portion 296 and the first plate mount 298 can be fixed for common rotation by the first connecting portion 300. The inner clutch plate carrier 262 can have an inner portion 302, a second plate mount 304, and a second connecting portion 306. The inner portion 302 can be radially inward of the second plate mount 304 and non-rotatably coupled to axially extending portion 236 of the input member 214. The plurality of second clutch plates 266 can be non-rotatably and axially slidably coupled to the second plate mount 304 and interleaved with the first clutch plates 264 in a first annular cavity 308 that is radially between the first and second plate mounts 298, 304. The inner portion 302 and second plate mount 304 can be fixedly coupled by the second connecting portion 306. The second plate mount 304 and second connecting portion 306 of the inner clutch plate carrier 262 and the inner portion 296 and the first connecting portion 300 of the outer clutch plate carrier 260 can define a second annular cavity 310 radially inward of the first annular cavity 308. The outer portion 302 of the inner clutch plate carrier 262 can further define a plurality of lubrication holes 312 extending radially outward to fluidly couple the first and second annular cavities 308, 310. The inner portion 302, second plate mount 304, and second connecting portion 306 of the inner clutch plate carrier 262 can partially define a third annular cavity 314 axially spaced apart from the second annular cavity 310 and radially inward of the first annular cavity 308. The lubrication holes 312 can also fluidly couple the third annular cavity 314 with the first annular cavity 308. The second connecting portion 306 of the inner clutch plate carrier 262 can generally be a web defining a plurality of through-holes 316 fluidly coupling the second and third annular cavities 310, 314. In the example provided, the through-holes 316 are tapered in a direction that diverges with increasing distance away from the first connecting portion 300 of the outer clutch plate carrier 260 and toward the first side 276. The shape of the through-holes 316 may help direct the flow of lubricant fluid L through the second connecting portion 306 of the inner clutch plate carrier 262. The first connecting portion 300 of the outer clutch plate carrier 260 can also generally be a web defining a plurality of through-holes 318 to allow lubricant fluid L to enter the second annular cavity 310.

The piston 268 can be received in the piston chamber 182 and configured to translate along the second axis 240. The piston 268 can be configured to move within the piston chamber 182 between an extended position and a retracted position relative to the plurality of first and second clutch plates 264, 266. The pump 272 can be mounted to the housing 210 proximate to the pinion shaft 224 in a space generally between the housing 210 and the clutch housing 258. The pump motor 274 can be a 2-way servo motor capable of running in forward and reverse and can be drivingly coupled to the pump 272 to selectively operate the pump 272. The pump 272 and pump motor 274 can extend radially outward from the first axis, generally parallel to the ground (not shown) and second axis 240, and above the bottom of the housing 210 and clutch housing 258 and can be configured to supply a hydraulic fluid to the piston chamber 182 to move the piston 268 from the retracted position to the extended position. The pump can be configured to selectively remove hydraulic fluid from the piston chamber 182 to move the piston 268 from the extended position to the retracted position The apply plate 270 can be received in the second cavity 280 between the piston 268 and the plurality of first and second clutch plates 264, 266. The piston 268 can be configured to translate the apply plate 270 along the second axis 240 to selectively engage the first and second clutch plates 264, 266 to compress the first and second clutch plates 264, 266 against one another so that the second clutch 48 can transmit rotary power between the input member 214 and the differential case 244. It will be appreciated that the second clutch 48 is not configured to transmit rotary power between the input member 214 and the differential case 244 when the piston 268 is retracted.

With additional reference to FIG. 5, the clutch housing 258 can define a circumferentially-extending oil pocket 320 that is employed to hold a portion of the lubricant fluid L in the clutch housing 258 to thereby reduce the amount of lubricant fluid L in the clutch sump S of the clutch housing 258. By reducing the amount of lubricant fluid L in the clutch sump S, the oil pocket 320 can thereby reduce the "paddling effect" that occurs as the outer clutch plate carrier 260 rotates through the lubricant fluid L in the clutch sump S. The oil pocket 320 can have a main portion 322 and a pair of ends 324, 326. The main portion 322 and ends 324, 326 can be disposed about a portion of the circumference of the bore 290 in the clutch housing 258 in which the outer clutch plate carrier 260 is received. The main portion 322 can be disposed in the second wall 288 proximate to the juncture of the second wall 288 and the inner bore surface 292. The ends 324, 326 can be disposed above a static lubricant level 328, which is the level in the clutch sump S of the clutch housing 258 that the lubricant fluid L will attain when the vehicle 10 is not being operated and is disposed on flat and level ground. The main portion 322 can extend around the circumference of the second wall 288 between the ends 324, 326 and above the static lubricant level 328. In the example provided, the static lubricant level 328 is below a horizontal center line 330 of the clutch housing 258 that intersects the second axis 240 and is parallel to the ground (not shown) when the vehicle 10 is on level ground. In the example provided, the ends 324, 326 are disposed between the static lubricant level 328 and the center line 330.

Optionally, the clutch housing 258 can define one or more channels 332. The channels 332 can have a helical or arcuate shape that extends radially inward from the oil pocket 320 to allow a portion of the lubricant fluid L in the oil pocket 320 to be drained via one or more of the channels 332. The channels 332 can direct a portion of the lubricant fluid L that is received into the oil pocket 320 to other structures or components, such as a bearing 334 that supports the outer clutch plate carrier 260 for rotation in the clutch housing 258, a bushing 336 that supports output shaft 218 within the clutch housing 258, and/or the first and second clutch plates 264, 266, for example. The channels 332 can be disposed in the second wall 288 above the static lubricant level 328. The channels 332 can have an inlet end 338 and an outlet end 340. The inlet end 338 can open into the main portion 322 and generally face circumferentially toward end 324. The outlet end 340 can be radially inward of the inlet end 338. The channels 332 can extend in an arcuate or helical path from the inlet end 338 to the outlet end 340. While the channels 332 are shown as open channels, open to the second cavity 280, the channels 332 can alternatively be closed conduits open at the inlet end 338 and outlet end 340. The outlet end 340 can be configured to direct lubricant fluid L toward the bearing 334, bushing 336, and/or toward the second annular cavity 310. In the example provided, three channels 332 are illustrated, though the clutch housing 258 can define additional or fewer channels 332. While each of the channels is shown as extending similarly radially inward, the channels 332 can be configured to extend different distances radially inward such that the respective outlet ends 340 can be configured to transmit the lubricant fluid L to different components or locations in the clutch housing 258. In the example provided, each inlet end 338 is circumferentially between the ends 324, 326 of the oil pocket 320, and each inlet end 338 is above the center line 330 of the clutch housing 258.

With additional reference to FIGS. 6 and 7, FIG. 6 depicts the lubricant fluid L in the second clutch 48 when the vehicle 10 is at rest, while FIG. 7 depicts the lubricant fluid L in the second clutch 48 when the vehicle 10 is moving and the second clutch 48 is not being operated (i.e., the second clutch 48 is not transmitting rotary power). During operation of the vehicle 10 in both the two-wheel drive and four-wheel drive modes, the outer clutch plate carrier 260 can rotate in a rotational direction 342 (FIG. 5) within the clutch housing 258 and through the lubricant fluid L in the clutch sump S. Some of the lubricant fluid L in the clutch sump S can cling to the outer clutch plate carrier 260 as it rotates through the lubricant fluid L in the clutch sump S and centrifugal force can sling or direct some of the clinging lubricant fluid L off the outer clutch plate carrier 260 toward the inner bore surface 292 of the clutch housing 258.

The bore 290 can be sized with a clearance that facilitates axial lubricant fluid L flow in an axial direction 344 (i.e., parallel to the rotational axis of the outer clutch plate carrier 260) toward the second wall 288 of the clutch housing 258. In this regard, lubricant fluid L that clings to the outer clutch plate carrier 260 or which passes in radially through the first and second clutch plates 264, 266 and the outer clutch plate carrier 260 can be received into a fourth annular cavity 346 between the inner bore surface 292 and the outer clutch plate carrier 260. The lubricant fluid L in the fourth annular cavity 346 can travel axially in the fourth annular cavity 346 in the direction 344 toward the oil pocket 320. The rotation of the outer clutch plate carrier 260 in the rotational direction 342 will cause the lubricant fluid L to travel in the oil pocket 320 in the rotational direction 342 and consequently, lubricant fluid L will tend to migrate into the channels 332. In the particular example provided, a first portion of the lubricant fluid L in the channels 332 is employed to feed lubricant fluid L to the bearing 334 and the bushing 336, while a second portion of the lubricant fluid L in the channels 332 is directed inwardly to the second annular cavity 310 through the through-holes 318 in the outer clutch plate carrier 260. As shown in FIG. 7, when the vehicle 10 is moving and the second clutch 48 is not being operated, a portion of the lubricant fluid L is removed from the clutch sump S and held in the oil pocket 320, out of the rotating path of the outer clutch plate carrier 260.

The reduction of the total amount of lubricant fluid L that the outer clutch plate carrier 260 rotates through can decrease the drag, or spin losses on the rear drive module 50. Additionally, by redistributing some of the lubricant fluid L from the clutch sump S to other locations, the "paddling effect" can be reduced. Furthermore, the channels 332 can direct some of the lubricant fluid L held in the oil pocket 320 toward other components to lubricate the other components.

Specifically, by directing some of the lubricant fluid L into the second annular cavity 310, the lubricant fluid L can pass through the lubrication holes 312 to lubricate the first and second clutch plates 264, 266.

When the second clutch 48 is operated to transmit rotational power, both the outer and inner clutch plate carriers 260, 262 can rotate about the second axis 240. The lubricant fluid L can be distributed and directed by the rotation of the outer and inner clutch plate carriers 260, 262 similar to when the second clutch 48 is not operated. Additionally, some of the lubricant fluid L directed into the second and third annular cavities 310, 314 can cling to the inner clutch plate carrier 262 and the rotation of the inner clutch plate carrier 262 can cause some of the lubricant fluid L in the second and third annular cavities 310, 314 to pass through the lubrication holes 312 into the first annular cavity 308 to lubricate the first and second clutch plates 264, 266.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A torque transfer device comprising:
    a housing having an end wall and defining a shaft bore and a central cavity, the shaft bore extending through the end wall, the central cavity being disposed about the shaft bore and being bounded on one axial side by the end wall; and
    a clutch having a first clutch member, the first clutch member being received in the central cavity and rotatable relative to the housing about a rotational axis;
    wherein a portion of the central cavity forms a lubricant sump that is configured to hold a predetermined quantity of lubricant through which at least a portion of the clutch rotates when the torque transfer device is transmitting rotary power;
    wherein a groove is formed into the end wall of the housing at a periphery of the central cavity, wherein the groove does not intersect the sump when the housing is positioned in a predetermined position about the rotational axis, and wherein a portion of the first clutch member and a portion of the groove are disposed axially in-line with one another.

2. The torque transfer device of claim 1, further comprising a bearing mounted to the housing concentric with the shaft bore, and wherein a channel is formed in the end wall, the channel having an outlet end that is in fluid communication with the bearing.

3. The torque transfer device of claim 2, wherein the channel is arcuate in shape.

4. The torque transfer device of claim 2, wherein the channel has a spiral shape.

5. The torque transfer device of claim 2, wherein the channel has an inlet end that is coupled in fluid communication to the groove.

6. The torque transfer device of claim 2, wherein a hole is formed through the first clutch member, the hole being positioned in a radial direction so as to sweep across the channel when the first clutch member rotates about the rotational axis relative to the housing, the hole in the first clutch member being configured to receive lubricant therethrough when the first clutch member rotates during operation of the torque transfer device.

7. The torque transfer device of claim 1, wherein the groove is shaped as an annular segment.

8. The torque transfer device of claim 1, wherein the clutch is a friction clutch.

9. The torque transfer device of claim 1, further comprising a thrust bearing disposed between the end wall and the first clutch member, the thrust bearing being radially inward of the groove.

10. The torque transfer device of claim 1, wherein the housing comprises an annular wall that is fixedly coupled to the end wall, the annular wall forming a radially outer perimeter of the central cavity, wherein at least a portion of an inside circumferential surface of the annular wall tapers radially outwardly with increasing distance from the end wall.

11. A torque transfer device comprising:
a housing assembly having a first housing member and a second housing member that are coupled together and cooperate to define a central cavity, the first housing member defining an annular piston bore, the second housing member having an end wall and defining a shaft bore, the shaft bore extending through the end wall, the central cavity being bounded on one axial side by the end wall; and
a friction clutch having an input member, an output member, a plurality of first clutch plates, and a plurality of second clutch plates, the input and output members being received in the central cavity and rotatable about a rotational axis, the first clutch plates being received over and non-rotatably coupled to the input member, the second clutch plates being received in and non-rotatably coupled to the output member, the second clutch plates being interleaved with the first clutch plates;
wherein a portion of the central cavity forms a lubricant sump that is configured to hold a predetermined quantity of lubricant through which at least a portion of the clutch rotates when the torque transfer device is transmitting rotary power;
wherein a groove is formed into the end wall of the second housing member at a periphery of the central cavity, wherein the groove does not intersect the sump when the housing assembly is positioned in a predetermined position about the rotational axis, and wherein a portion of the output member and a portion of the groove are disposed axially in-line with one another.

12. The torque transfer device of claim 11, further comprising a bearing mounted to the second housing member concentric with the shaft bore, and wherein a channel is formed in the end wall, the channel having an outlet end that is in fluid communication with the bearing.

13. The torque transfer device of claim 12, wherein the channel is arcuate in shape.

14. The torque transfer device of claim 12, wherein the channel has a spiral shape.

15. The torque transfer device of claim 12, wherein the channel has an inlet end that is coupled in fluid communication to the groove.

16. The torque transfer device of claim 12, wherein a hole is formed through the output member, the hole being positioned in a radial direction so as to sweep across the channel when the output member rotates about the rotational axis relative to the housing assembly, the hole in the output member being configured to receive lubricant therethrough when the first clutch member rotates during operation of the torque transfer device.

17. The torque transfer device of claim 11, wherein the groove is shaped as an annular segment.

18. The torque transfer device of claim 11, further comprising a thrust bearing disposed between the end wall and the output member, the thrust bearing being radially inward of the groove.

19. The torque transfer device of claim 11, wherein the second housing member comprises an annular wall that is fixedly coupled to the end wall, the annular wall forming a radially outer perimeter of the central cavity, wherein at least a portion of an inside circumferential surface of the annular wall tapers radially outwardly with increasing distance from the end wall.

* * * * *